(12) United States Patent
Fukui

(10) Patent No.: US 10,593,016 B2
(45) Date of Patent: Mar. 17, 2020

(54) IMAGE PROCESSING UNIT, IMAGE PROCESSING METHOD, AND PROJECTION SYSTEM

(71) Applicant: SONY CORPORATION, Tokyo (JP)

(72) Inventor: Kenichi Fukui, Tokyo (JP)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 15/580,768

(22) PCT Filed: Jun. 9, 2016

(86) PCT No.: PCT/JP2016/067258
§ 371 (c)(1),
(2) Date: Dec. 8, 2017

(87) PCT Pub. No.: WO2016/204068
PCT Pub. Date: Dec. 22, 2016

(65) Prior Publication Data
US 2018/0232855 A1 Aug. 16, 2018

(30) Foreign Application Priority Data

Jun. 19, 2015 (JP) .................. 2015-123612

(51) Int. Cl.
| | |
|---|---|
| *G06T 3/40* | (2006.01) |
| *G09G 3/00* | (2006.01) |
| *G06F 3/14* | (2006.01) |
| *H04N 9/31* | (2006.01) |
| *G03B 35/20* | (2006.01) |
| *H04N 5/232* | (2006.01) |

(52) U.S. Cl.
CPC ............ *G06T 3/4038* (2013.01); *G03B 35/20* (2013.01); *G06F 3/1446* (2013.01); *G09G 3/002* (2013.01);

(Continued)

(58) Field of Classification Search
CPC . G06T 3/4038; G06T 2200/32; H04N 9/3147; H04N 9/3194; H04N 9/3185;
(Continued)

(56) References Cited

U.S. PATENT DOCUMENTS

| | | | | |
|---|---|---|---|---|
| 6,695,451 | B1 * | 2/2004 | Yamasaki | ............... H04N 9/12 348/E5.144 |
| 9,560,327 | B2 * | 1/2017 | Ehara | .................. H04N 9/3185 |

(Continued)

FOREIGN PATENT DOCUMENTS

| | | |
|---|---|---|
| CN | 105474634 A | 4/2016 |
| EP | 1783684 A1 | 5/2007 |

(Continued)

OTHER PUBLICATIONS

International Search Report and Written Opinion of PCT Application No. PCT/JP2016/067258, dated Aug. 23, 2016, 10 pages of ISRWO.

*Primary Examiner* — Daniel G Mariam
(74) *Attorney, Agent, or Firm* — Chip Law Group

(57) ABSTRACT

An image processing unit of the disclosure includes an imaging section that acquires a plurality of partial images as a captured image, by imaging a projection screen provided by a projector through division of the projection screen into a plurality of regions to have partially overlapping imaging regions, and an estimation section that performs an operation a plurality of times on a basis of the captured image, the operation being performed to estimate a projection transformation matrix for linking of the partial images adjacent to each other.

10 Claims, 19 Drawing Sheets

(52) U.S. Cl.
CPC ....... *H04N 5/23238* (2013.01); *H04N 9/3147* (2013.01); *H04N 9/3185* (2013.01); *H04N 9/3194* (2013.01); *G06T 2200/32* (2013.01); *G09G 2300/026* (2013.01); *G09G 2310/0232* (2013.01); *G09G 2320/0693* (2013.01); *G09G 2360/16* (2013.01)

(58) Field of Classification Search
CPC .. H04N 5/23238; G06F 3/1446; G09G 3/002; G09G 2320/0693; G09G 2300/026; G09G 2310/0232; G09G 2360/16; G03B 35/20
USPC .......................................................... 382/284
See application file for complete search history.

(56) References Cited

U.S. PATENT DOCUMENTS

| | | | |
|---|---|---|---|
| 9,992,463 B2* | 6/2018 | Schultz | H04N 9/3185 |
| 2002/0011968 A1* | 1/2002 | Nishio | G03B 21/10 345/5 |
| 2008/0253606 A1 | 10/2008 | Fujimaki et al. | |
| 2013/0169888 A1* | 7/2013 | Tannhauser | H04N 9/3147 348/745 |
| 2016/0176343 A1 | 6/2016 | Sakano et al. | |

FOREIGN PATENT DOCUMENTS

| | | |
|---|---|---|
| EP | 3041228 A1 | 7/2016 |
| JP | 2000-350230 A | 12/2000 |
| JP | 2001-083949 A | 3/2001 |
| JP | 2004-015205 A | 1/2004 |
| JP | 2005-277825 A | 10/2005 |
| JP | 2006-053757 A | 2/2006 |
| JP | 2006-195540 A | 7/2006 |
| JP | 2007-300539 A | 11/2007 |
| WO | 2006/016664 A1 | 2/2006 |
| WO | 2015/029934 A1 | 3/2015 |

* cited by examiner

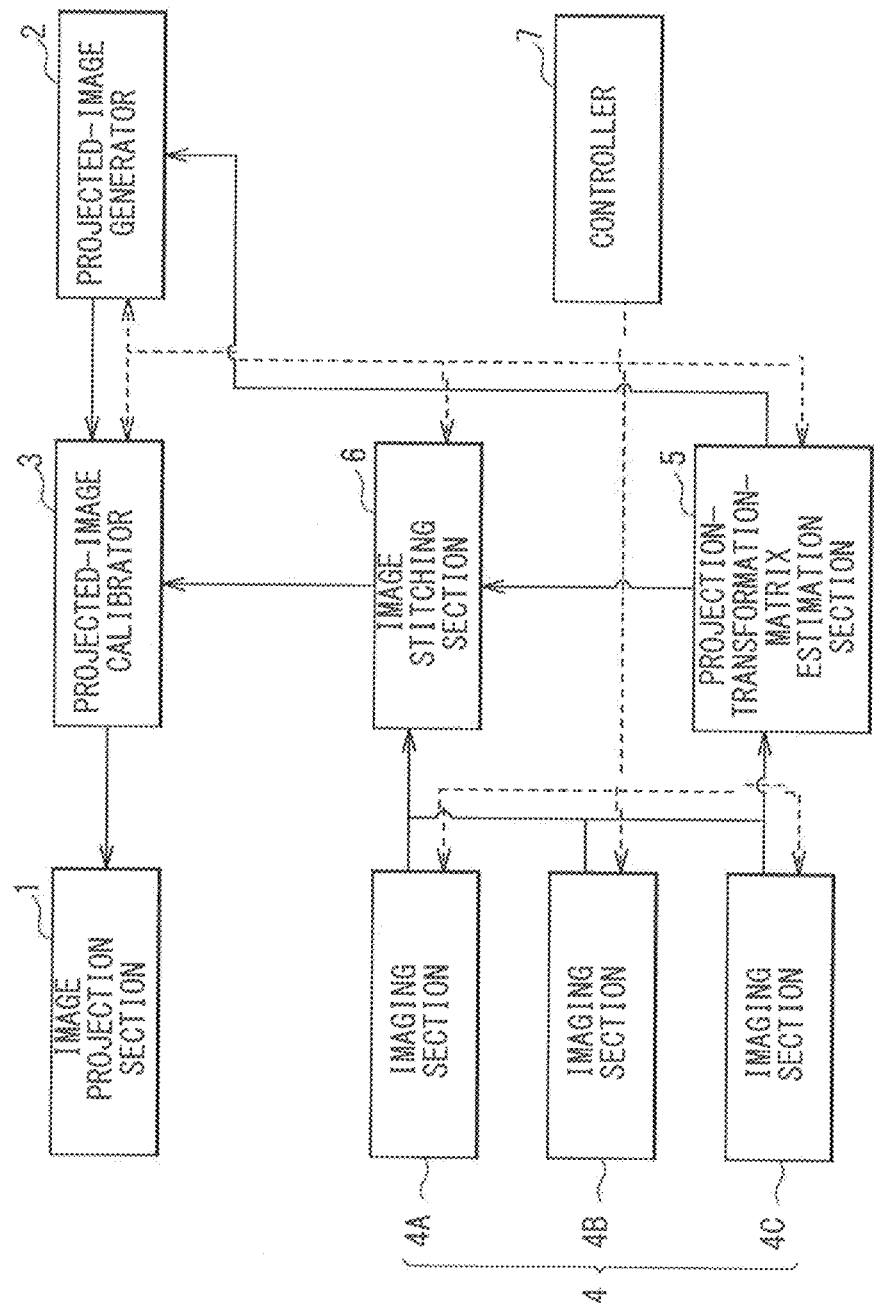
[FIG. 1]

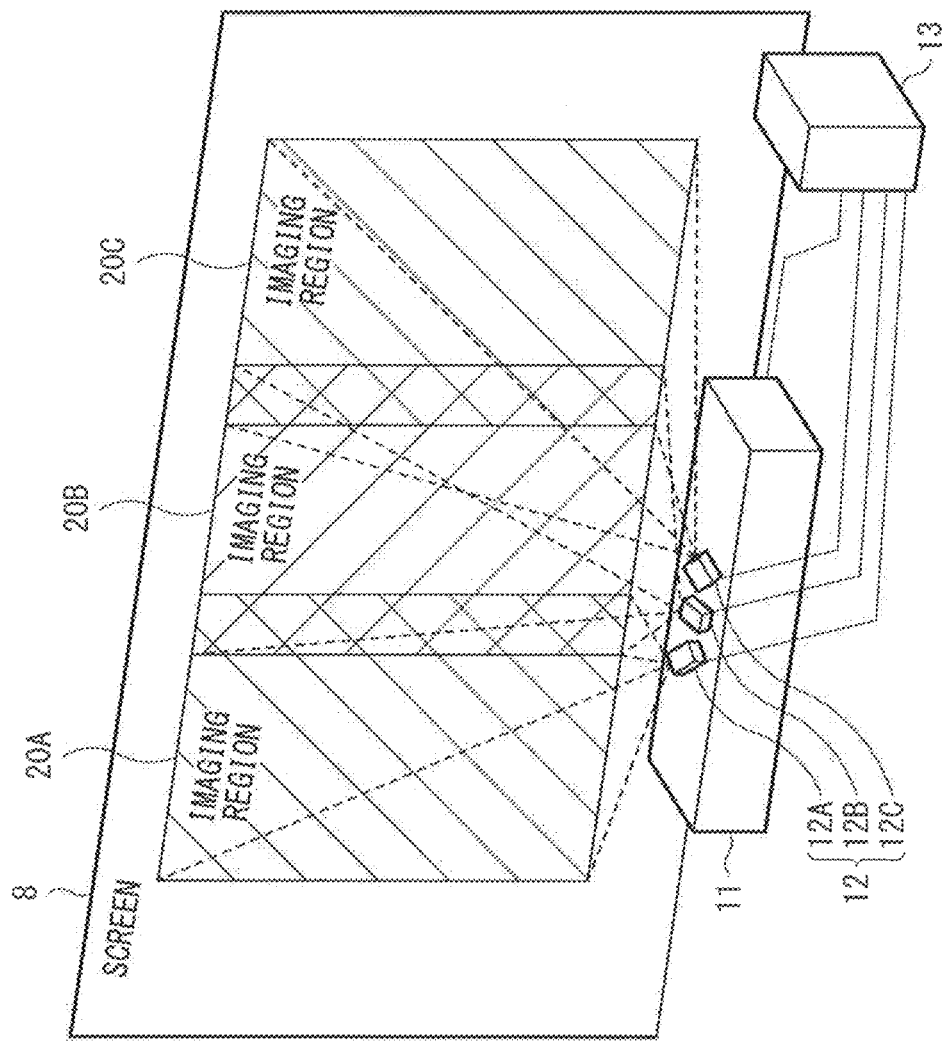
[FIG. 2]

[ FIG. 3 ]
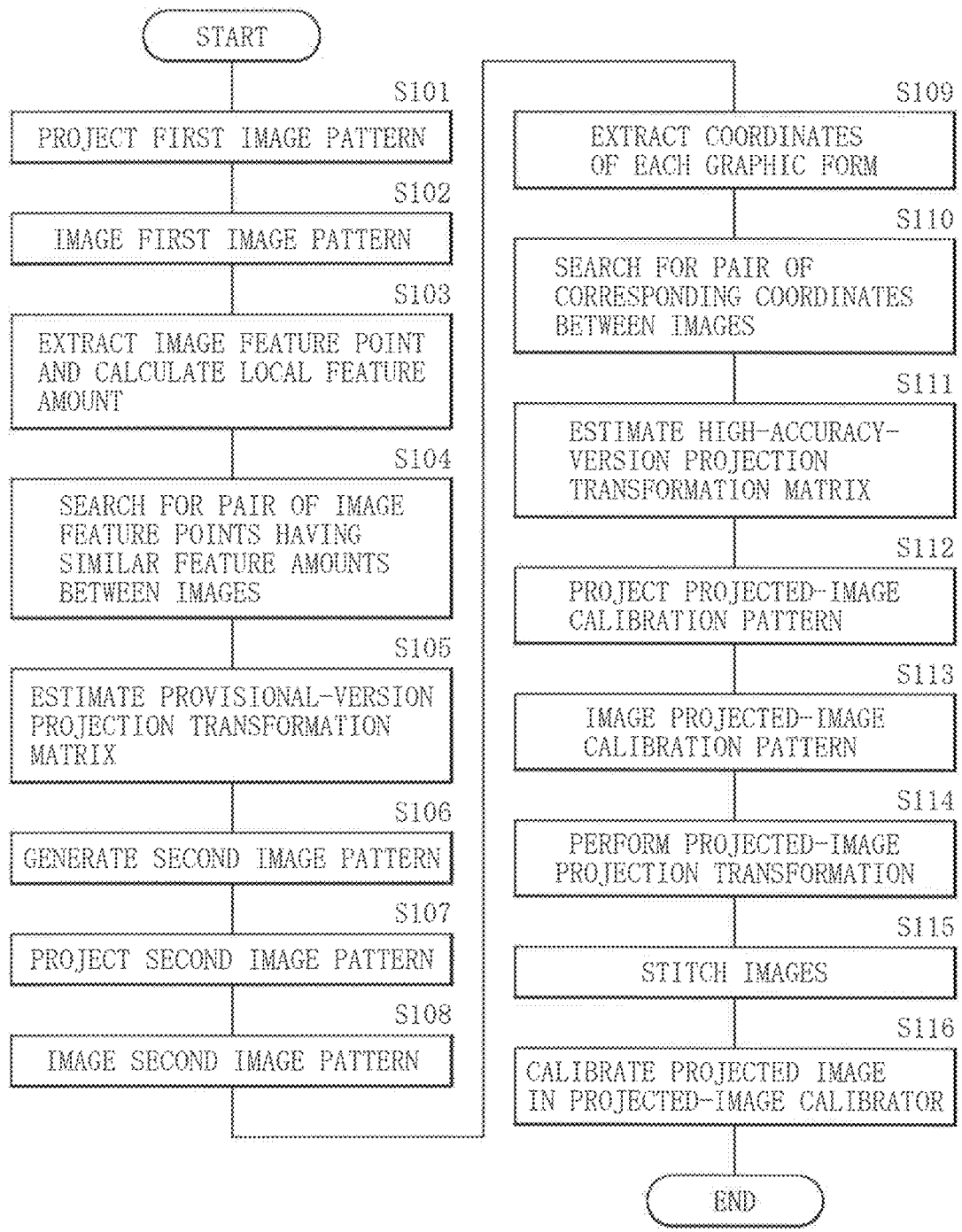

[ FIG. 4 ]
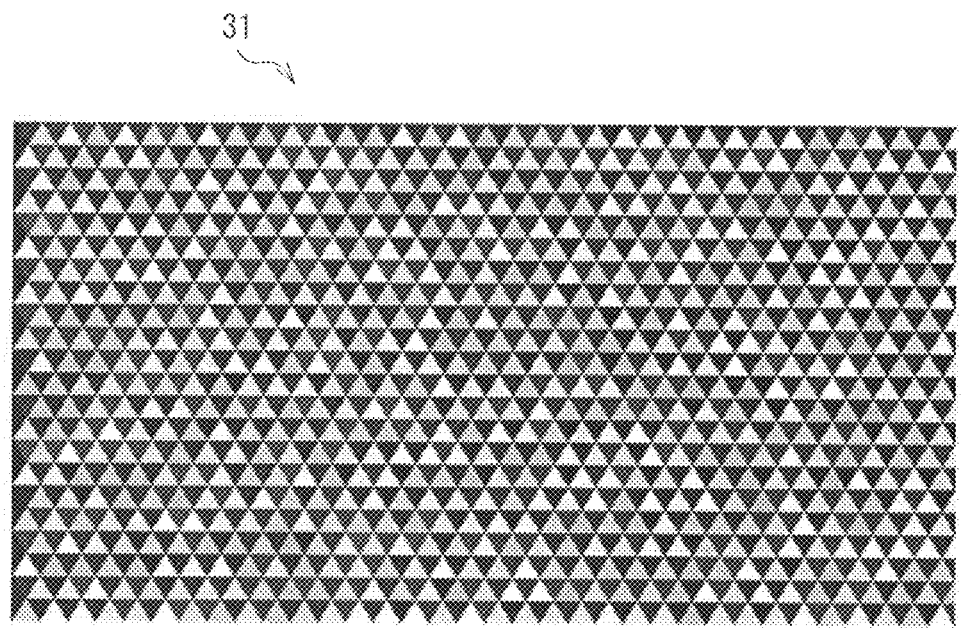
[ FIG. 5 ]
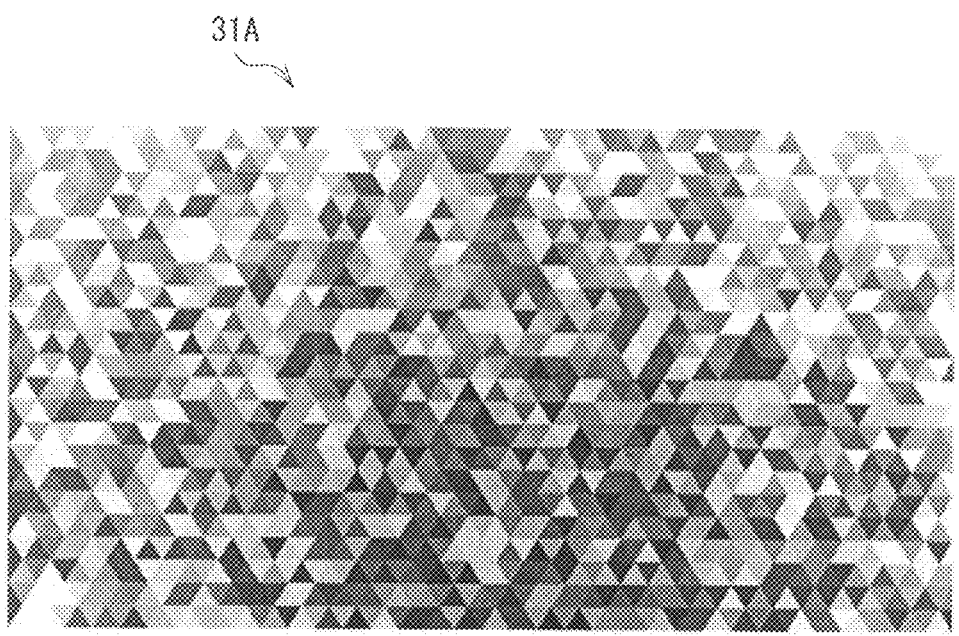

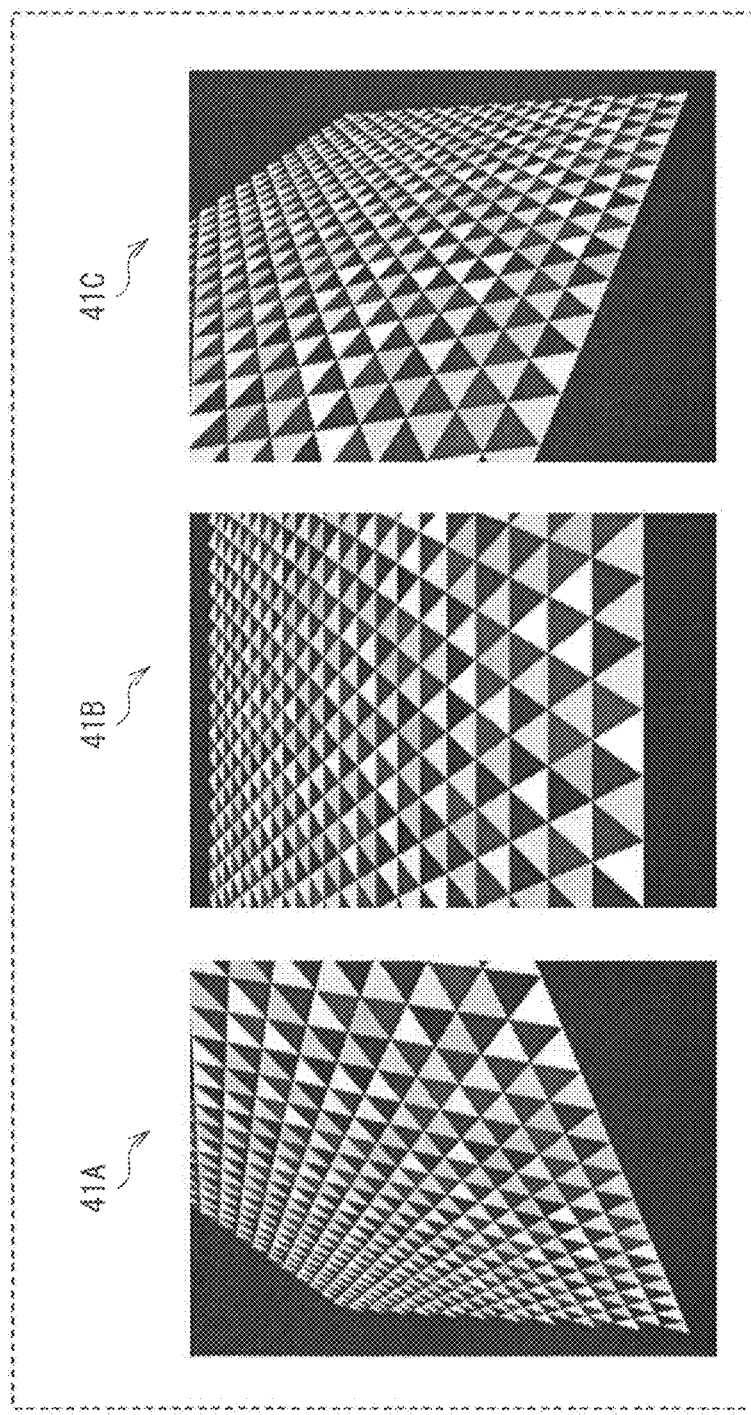

[FIG. 7]
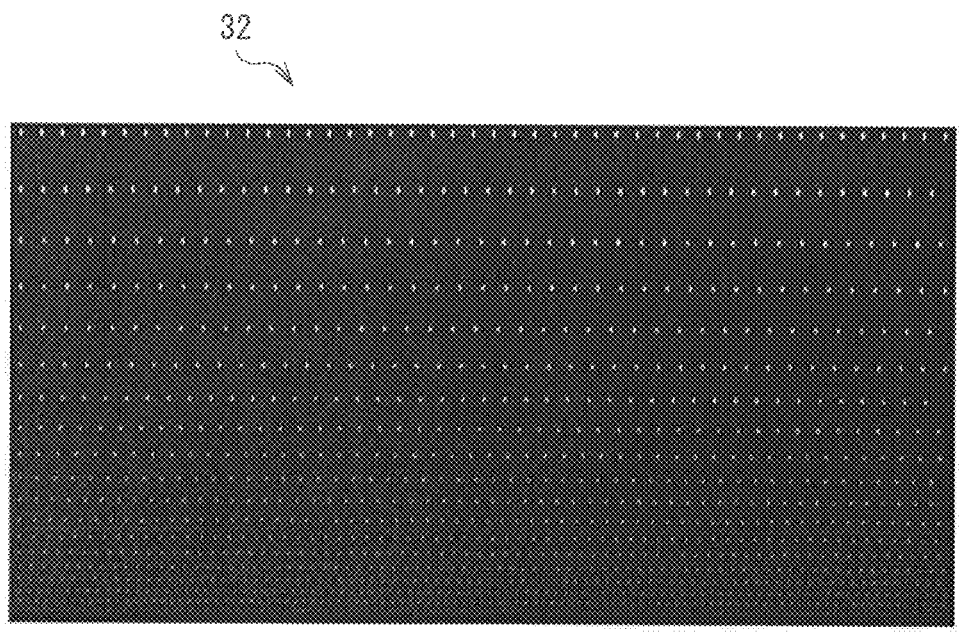

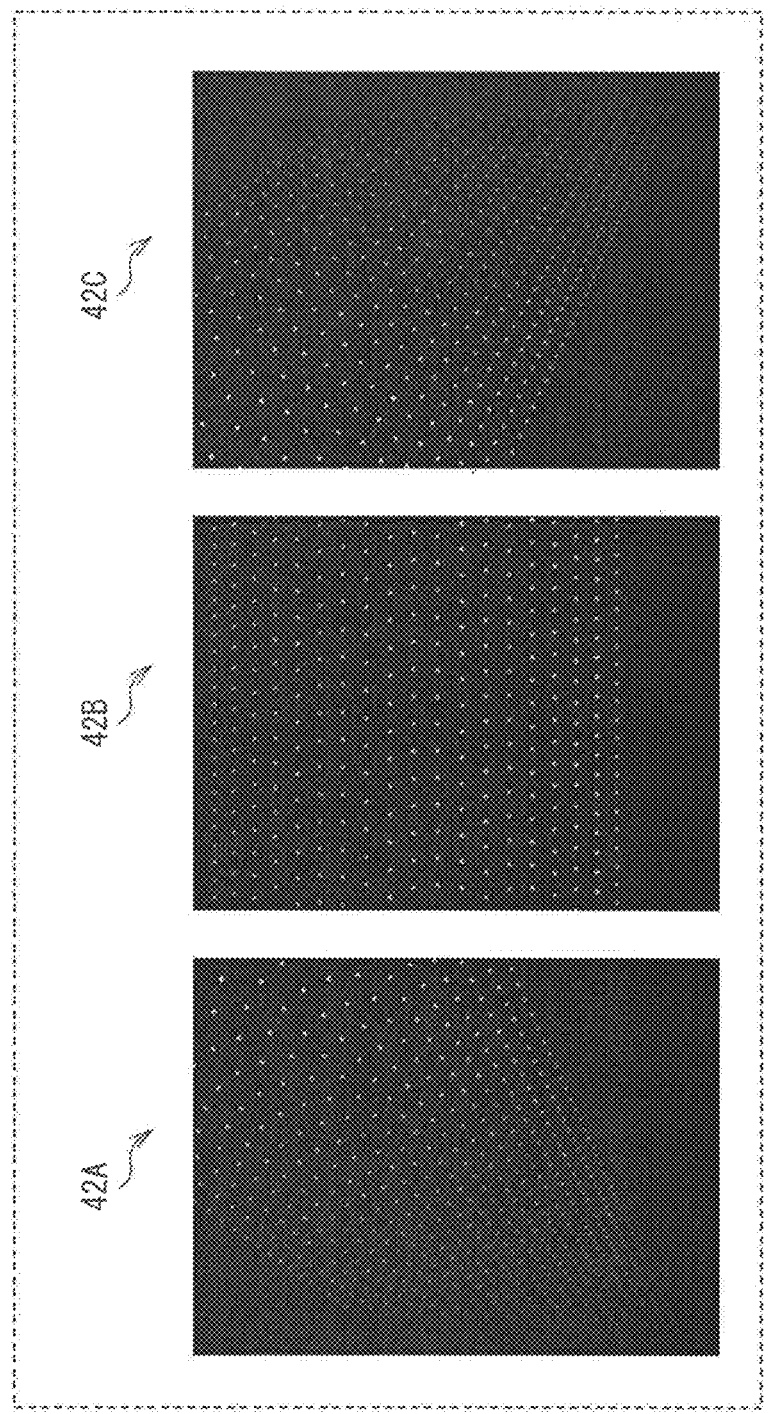
[FIG. 8]

[ FIG. 9 ]
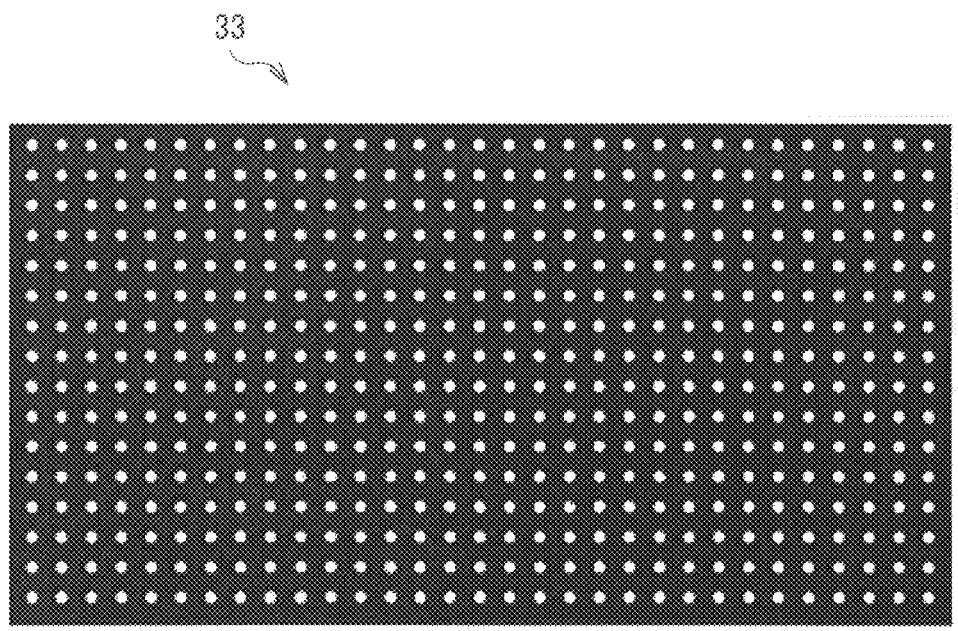

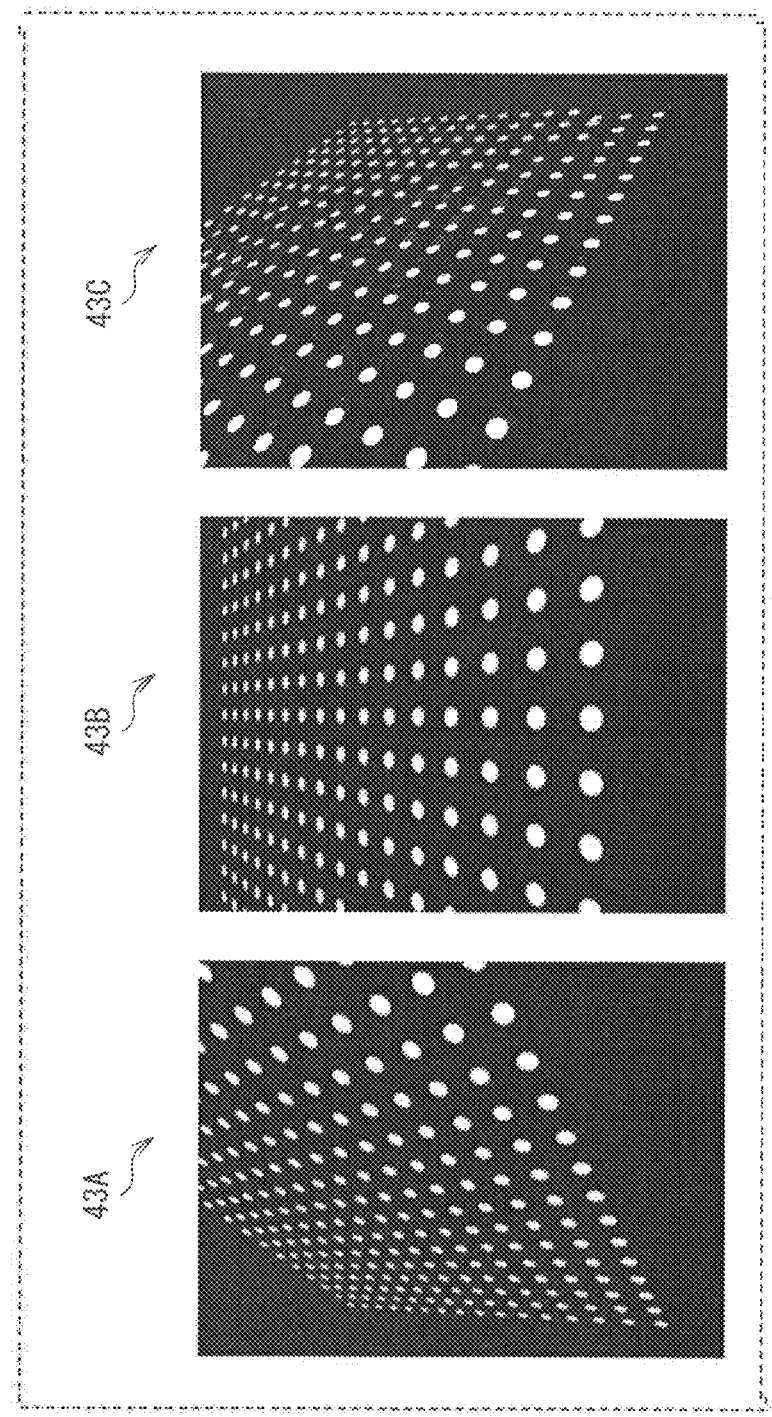

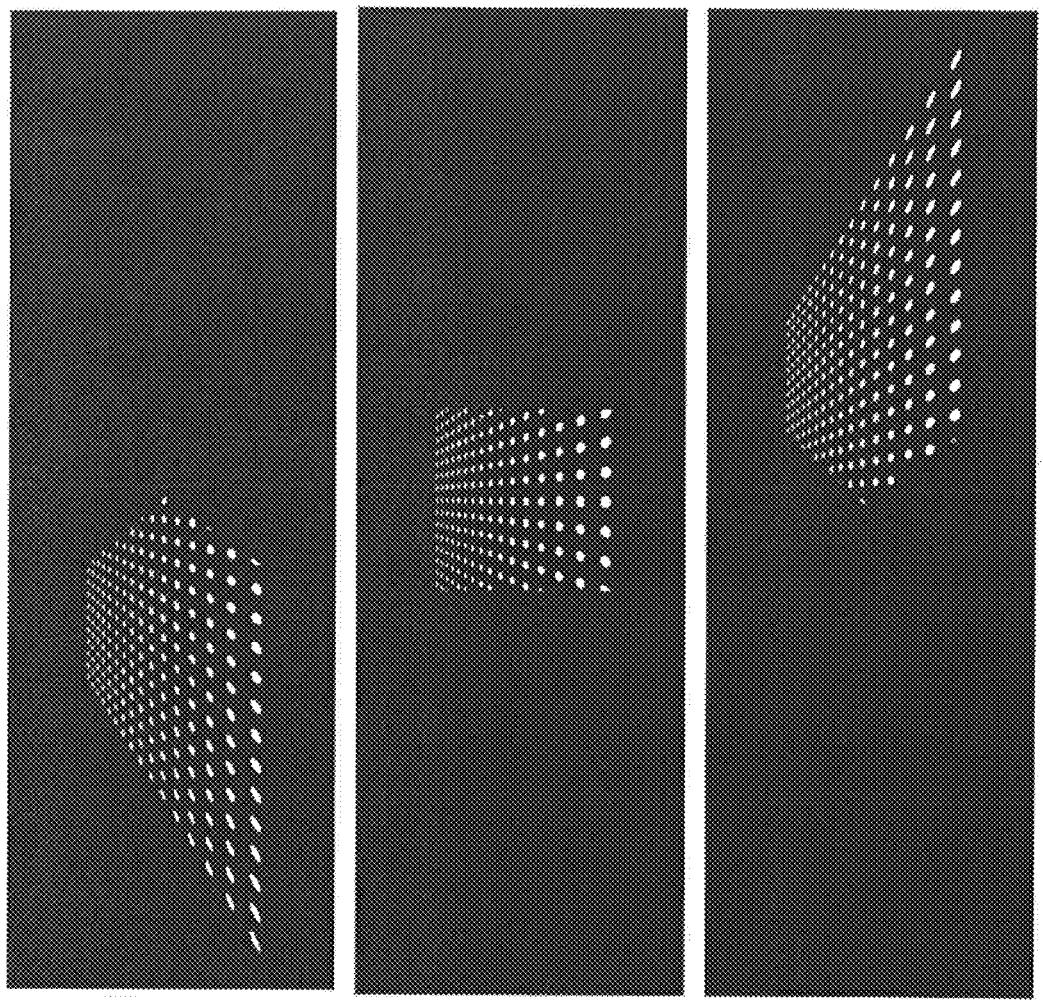

[FIG. 12]
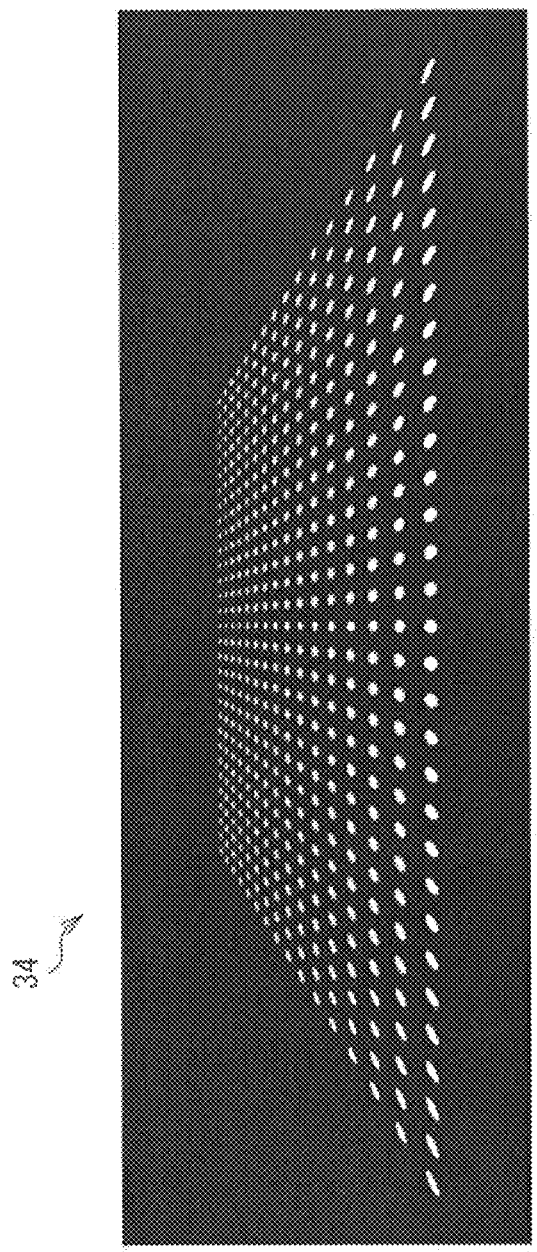

[ FIG. 13 ]
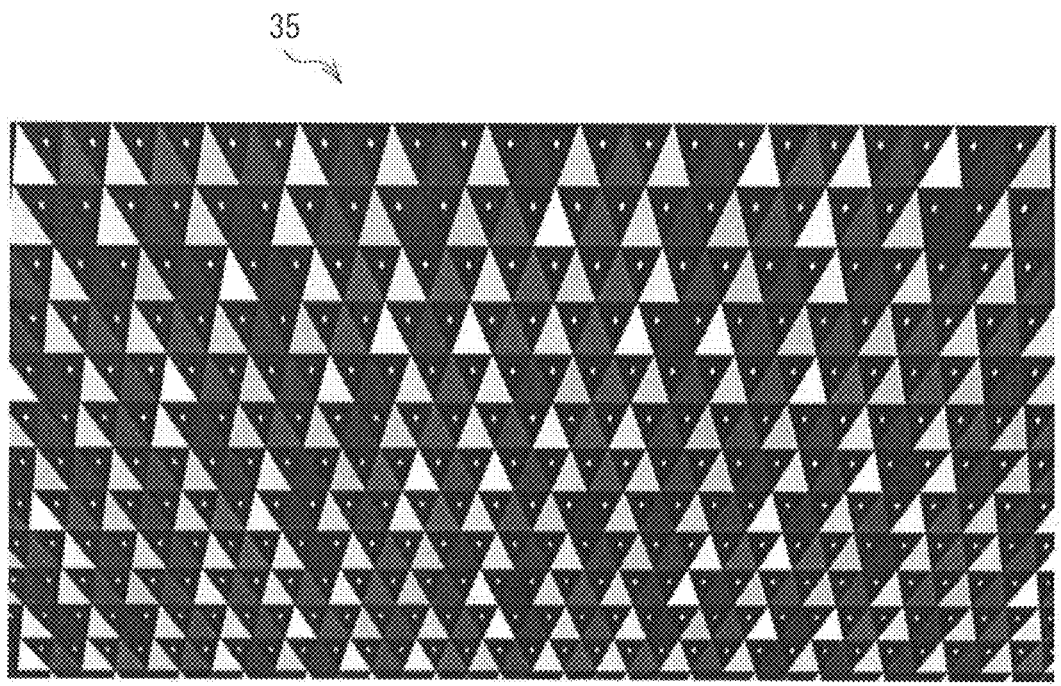

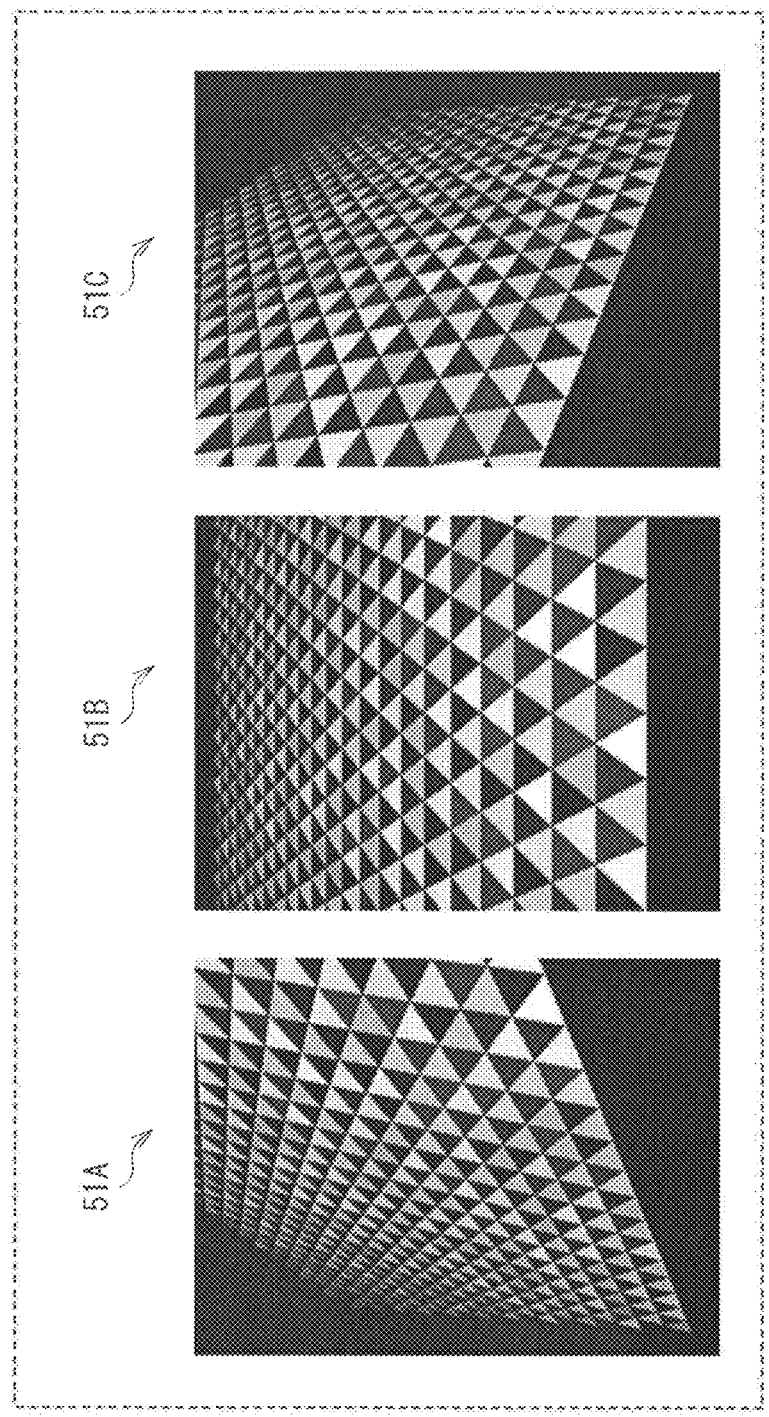
[FIG. 14]

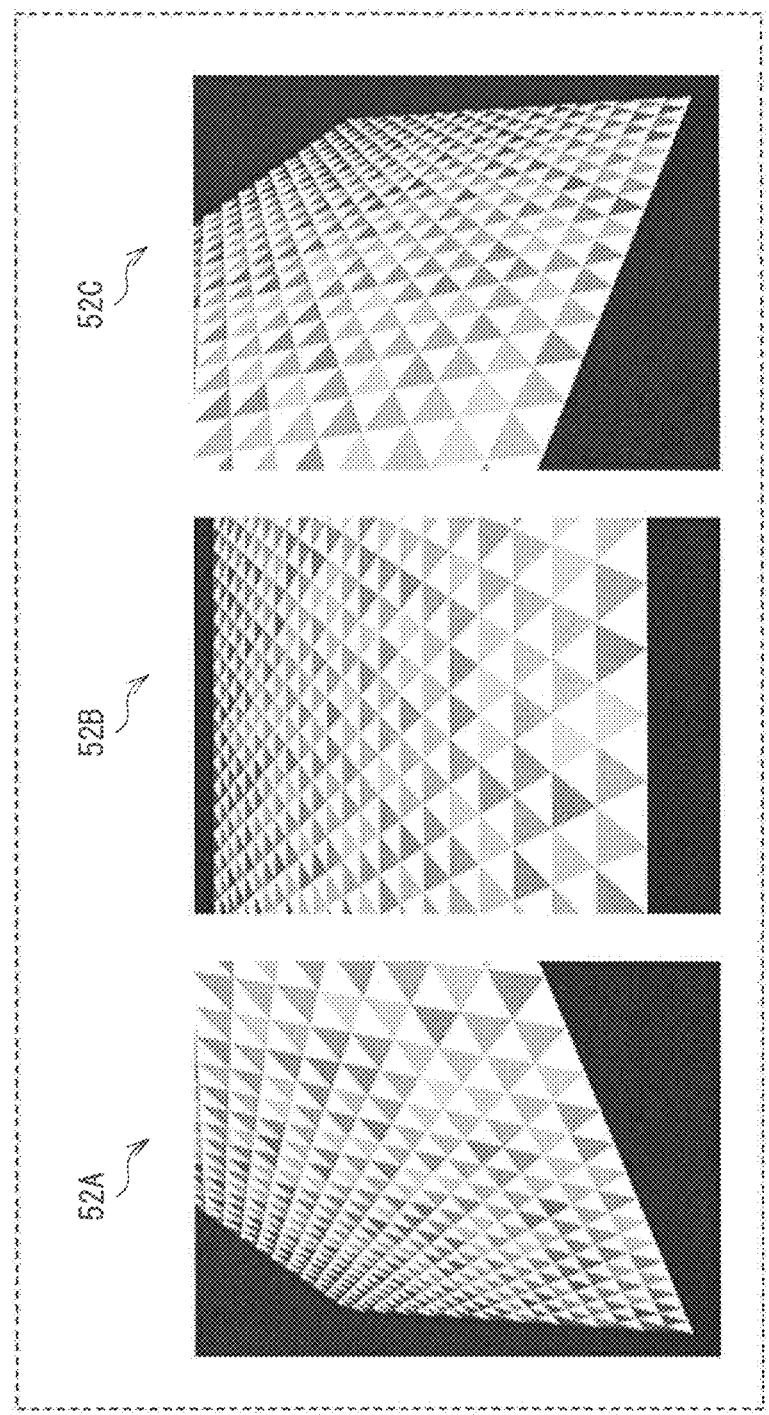
[FIG. 15]

[ FIG. 16 ]
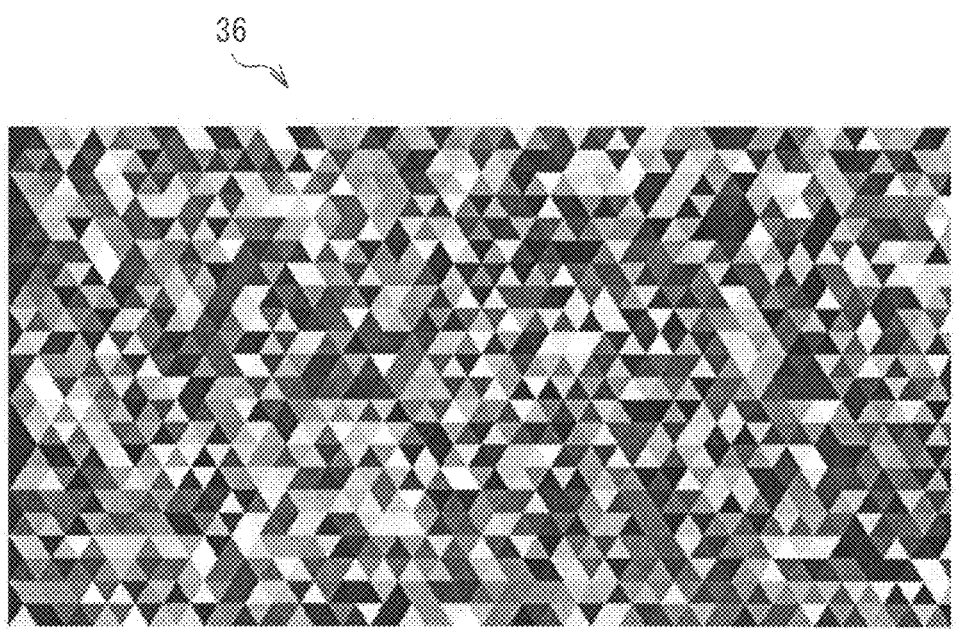

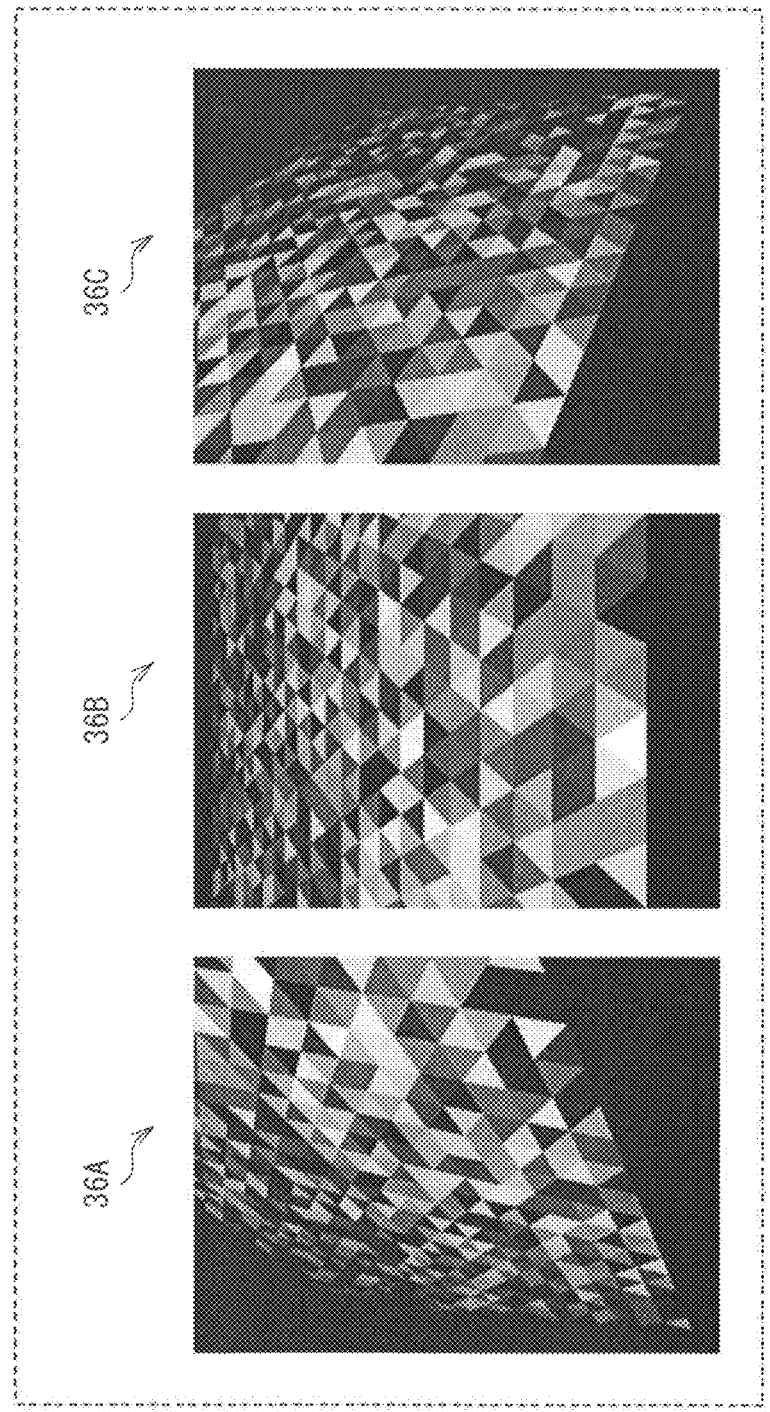
[FIG. 17]

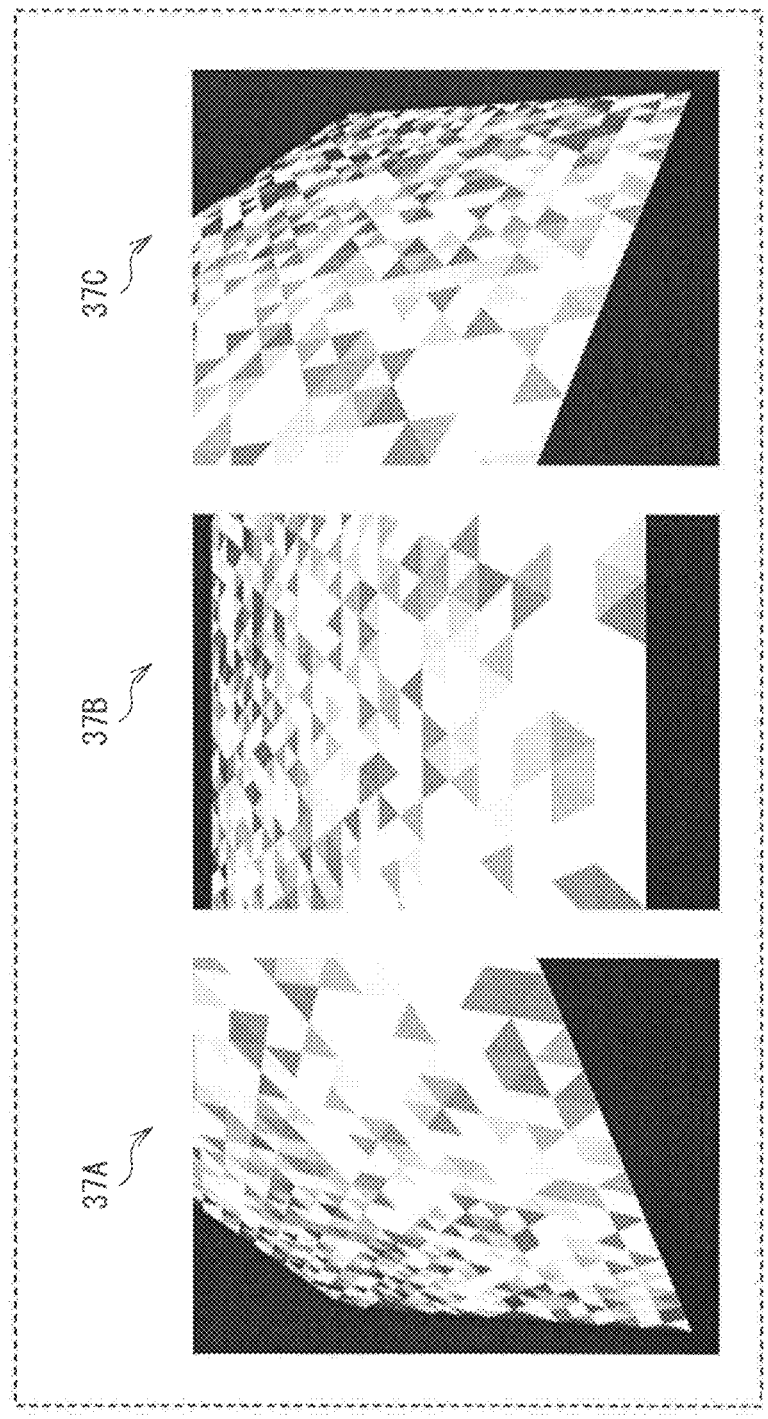
[FIG. 18]

[FIG. 19]
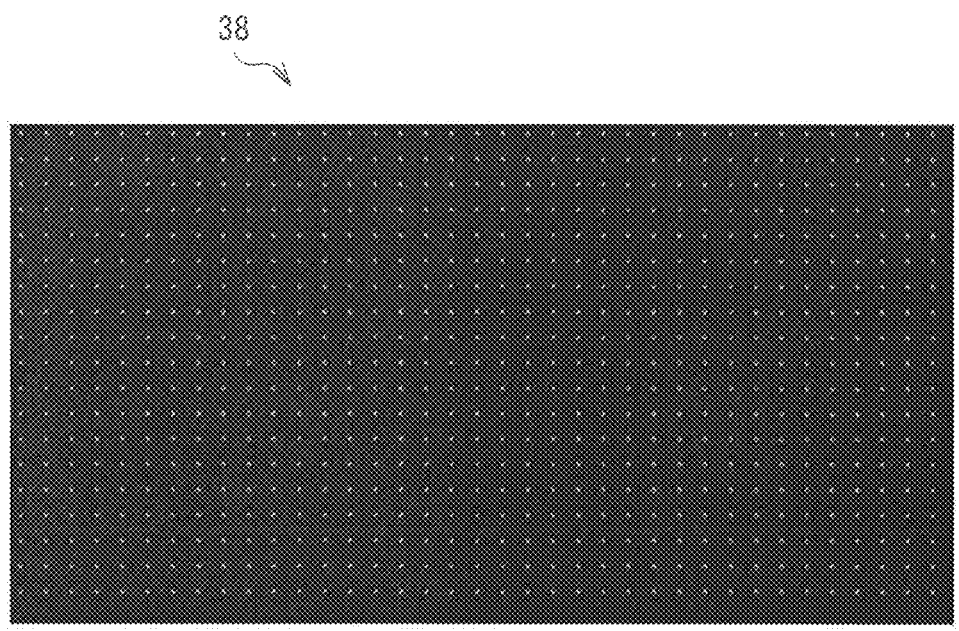

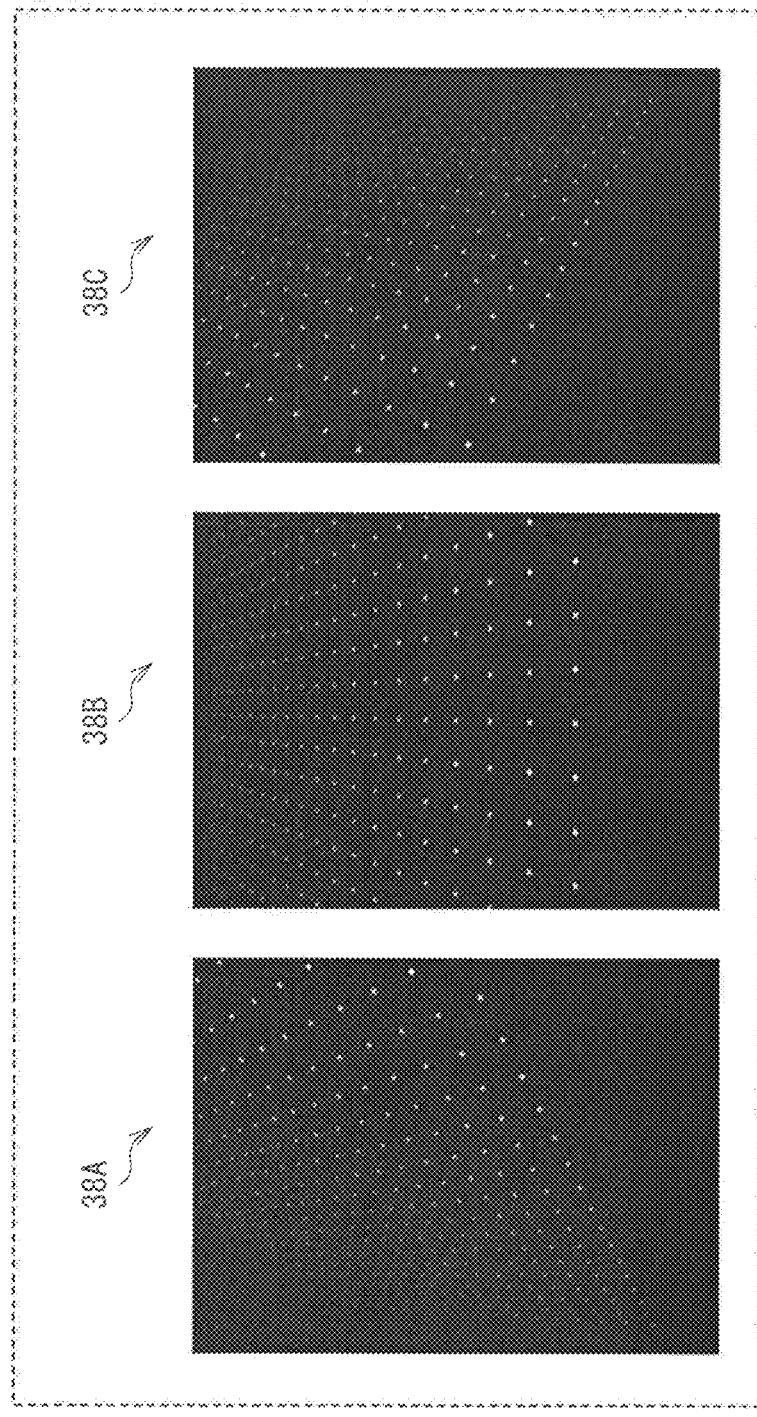
[FIG. 20]

IMAGE PROCESSING UNIT, IMAGE PROCESSING METHOD, AND PROJECTION SYSTEM

CROSS REFERENCE TO RELATED APPLICATIONS

This application is a U.S. National Phase of International Patent Application No. PCT/JP2016/067258 filed on Jun. 9, 2016, which claims priority benefit of Japanese Patent Application No. JP 2015-123612 filed in the Japan Patent Office on Jun. 19, 2015. Each of the above-referenced applications is hereby incorporated herein by reference in its entirety.

TECHNICAL FIELD

The disclosure relates to an image processing unit that has a function of calibrating a projected image, an image processing method, and a projection system.

BACKGROUND ART

As an application for a projector, there is one type that performs correction processing for distortion and luminance unevenness of a projection screen. Further, as for a multi-projection system that combines a plurality of projection screens into one projection screen by linking the projection screens, there is one type that subjects a projected image to edge blending processing that makes a joint between a plurality of projection screens inconspicuous. To perform these kinds of correction processing for a projection screen, there is a technique of performing calibration of a projection image to be projected by a projector, by imaging a projection screen through use of an imaging unit, and then analyzing a captured image. For example, PTL 1 discusses a technique of imaging a projection screen, and performing edge blending of a projected image, on the basis of the captured image.

CITATION LIST

Patent Literature

PTL 1: Japanese Unexamined Patent Application Publication No. 2004-15205
PTL 2: Japanese Unexamined Patent Application Publication No. 2005-277825

SUMMARY OF INVENTION

In recent years, ultra-short-focus projectors have been developed. An ultra-short-focus projector is installable in proximity to the screen, and is able to perform projection from a close range, unlike a vertical projection type projector. In a case where the above-described correction processing for a projection screen is performed in the ultra-short-focus projector, an imaging unit may be mounted on a projector main body, in order to improve user convenience during imaging of the projection screen. However, in a case where the imaging unit is mounted on the projector main body in the ultra-short-focus projector, it may not be possible to image the entire projection screen that should be imaged and is necessary for calibration, depending on a limit on an imaging angle of view of the imaging unit, or depending on a distance between the imaging unit and a screen, thus allowing for imaging of only a portion thereof. In that case, it is difficult to carry out calibration of a projected image. There is also a case where it is possible to image a necessary entire projection screen, by performing imaging using a camera such as a fish-eye camera having a wide imaging angle of view, but a wide angle camera is expensive and large. Hence, a sale of an imaging unit together with a projector to a customer results in an increase in product price. In addition, in a case where an imaging unit is built in a projector, a housing becomes larger. Moreover, preparation of an imaging unit separately from a projector by a customer also results in a rise in expense borne by the customer, which leads to a decrease in convenience of imaging.

In this regard, there is a method of obtaining a captured image of an entire projection screen, by stitching (joining) a plurality of captured images. The plurality of captured images are obtained by imaging a plurality of regions of a projection screen using a plurality of non-wide-angle low-cost small imaging units, or by imaging a projection screen a plurality of times using a single imaging unit by changing imaging regions. In this method, an image feature point and a local feature amount at the image feature point are extracted from each of the captured images to search for a pair of image feature points having similar local feature amounts between the captured images. Subsequently, a projection transformation matrix for stitching of the plurality of captured images is estimated from a correlation between coordinates of paired image feature points to stitch the plurality of captured images. In this method, more than one algorithm is proposed for extraction of an image feature point and a local feature amount. In general, the image feature point is a corner or an intersection point of lines of an object in an image, and the local feature amount is a numerical form of a luminance gradient of a range in the image. For example, suppose that an image resulting from projection transformation of an image A is set as an image B, and that corresponding coordinates in the respective images are set as coordinates A (xA, yA, 1) and as coordinates B (xB, yB, 1), in a homogeneous coordinate system. It is possible to express a relationship between the coordinates A and the coordinates B as B (xB*w, yB*w, w)=HA (xA, yA, 1), using a projection transformation matrix H that performs the projection transformation from the image A to the image B. Here, w is a homogeneous component.

In addition, it is also possible to stitch a plurality of captured images, by searching for corresponding points between a plurality of captured images through use of a correlation method or a template matching method, and estimating a matrix that performs projection transformation of an image from information thereof. This method is proposed in PTL 2.

However, when luminance unevenness, etc. occurs in a captured image, accuracy of estimation of a projection transformation matrix between images performed by the above-described method may be lowered, which may cause distortion in an image after the stitching. The luminance unevenness, etc. occurs due to an influence of noise or ambient light, a projection angle or imaging angle of a projector with respect to a screen, a reflection property of the screen, etc. Further, performing calibration of a projected image using a distorted image may lead to deterioration in calibration accuracy, such as unintended distortion correction, luminance correction, or alignment. Hence, it may be necessary to estimate a projection transformation matrix accurately even under various imaging conditions as described above.

It is desirable to provide an image processing unit, an image processing method, and a projection system that make it possible to perform calibration of a projected image accurately.

An image processing unit according to an embodiment of the disclosure includes: an imaging section that acquires a plurality of partial images as a captured image, by imaging a projection screen provided by a projector through division of the projection screen into a plurality of regions to have partially overlapping imaging regions; and an estimation section that performs an operation a plurality of times on a basis of the captured image, the operation being performed to estimate a projection transformation matrix for linking of the partial images adjacent to each other.

An image processing method according to an embodiment of the disclosure includes: acquiring a plurality of partial images as a captured image, by imaging a projection screen provided by a projector through division of the projection screen into a plurality of regions to have partially overlapping imaging regions; and performing an operation a plurality of times on a basis of the captured image, the operation being performed to estimate a projection transformation matrix for linking of the partial images adjacent to each other.

A projection system according to an embodiment of the disclosure includes: a projector; an imaging section that acquires a plurality of partial images as a captured image, by imaging a projection screen provided by a projector through division of the projection screen into a plurality of regions to have partially overlapping imaging regions; and an estimation section that performs an operation a plurality of times on a basis of the captured image, the operation being performed to estimate a projection transformation matrix for linking of the partial images adjacent to each other.

In the image processing unit, the image processing method, or the projection system according to the embodiment of the disclosure, the plurality of partial images are acquired as the captured image, by imaging the projection screen provided by the projector through division of the projection screen into the plurality of regions to have partially overlapping imaging regions. Further, the operation for the estimation of the projection transformation matrix for linking of the partial images adjacent to each other is performed a plurality of times on the basis of the captured image.

According to the image processing unit, the image processing method, or the projection system according to the embodiment of the disclosure, the operation for the estimation of the projection transformation matrix for linking of the partial images adjacent to each other is performed a plurality of times on the basis of the captured image. It is therefore possible to estimate the projection transformation matrix accurately. Calibration of a projected image is performed on the basis of an image generated by linking the plurality of partial images through projection transformation using the projection transformation matrix. It is therefore possible to perform the calibration of the projected image accurately.

It is to be noted that effects described here are not necessarily limitative, and may be any of effects described herein.

BRIEF DESCRIPTION OF DRAWINGS

FIG. 1 is a block diagram illustrating an example of a functional configuration of a projection system according to an embodiment of the disclosure.

FIG. 2 is an external view illustrating a specific example of a projection system for implementation of functions illustrated in FIG. 1.

FIG. 3 is a flowchart illustrating an example of a procedure of calibration of a projected image in a projection system.

FIG. 4 is an explanatory diagram schematically illustrating an example of a first image pattern to be projected to estimate a provisional-version projection transformation matrix.

FIG. 5 is an explanatory diagram schematically illustrating another example of the first image pattern.

FIG. 6 is an explanatory diagram schematically illustrating an example of each of partial images to be acquired in a case where the first image pattern illustrated in FIG. 4 is projected onto a screen and then imaged.

FIG. 7 is an explanatory diagram schematically illustrating an example of a second image pattern to be projected to estimate a high-accuracy-version projection transformation matrix.

FIG. 8 is an explanatory diagram schematically illustrating an example of each of partial images to be acquired in a case where the second image pattern illustrated in FIG. 7 is projected onto a screen and then imaged.

FIG. 9 is an explanatory diagram schematically illustrating an example of a projected-image calibration pattern to be used for calibration of a projected image.

FIG. 10 is an explanatory diagram schematically illustrating an example of each of partial images to be acquired in a case where the projected-image calibration pattern illustrated in FIG. 9 is projected onto a screen and then imaged.

FIG. 11 is an explanatory diagram schematically illustrating an example of an image subjected to projection transformation of each of the partial images illustrated in FIG. 10.

FIG. 12 is an explanatory diagram schematically illustrating an example of a stitched image subjected to stitching of the partial images subjected to the projection transformation illustrated in FIG. 11.

FIG. 13 is an explanatory diagram schematically illustrating an example of a mixture pattern in which the first image pattern and the second image pattern are mixed.

FIG. 14 is an explanatory diagram schematically illustrating an example of each of partial images to be acquired in a case where the first image pattern illustrated in FIG. 4 is projected onto a screen having a reflection-type property and then imaged.

FIG. 15 is an explanatory diagram schematically illustrating an example of each of partial images to be acquired in a case where imaging conditions are adjusted for FIG. 14 and then imaging is performed.

FIG. 16 is an explanatory diagram schematically illustrating an example of an image pattern of a comparative example with respect to the first image pattern illustrated in FIG. 4.

FIG. 17 is an explanatory diagram schematically illustrating an example of each of partial images to be acquired in a case where the first image pattern according the comparative example illustrated in FIG. 16 is projected onto a screen having a reflection-type property and then imaged.

FIG. 18 is an explanatory diagram schematically illustrating an example of each of partial images to be acquired in a case where imaging conditions are adjusted for FIG. 17 and then imaging is performed.

FIG. 19 is an explanatory diagram schematically illustrating an example of an image pattern of a comparative example with respect to the second image pattern illustrated in FIG. 7.

FIG. 20 is an explanatory diagram schematically illustrating an example of each of partial images to be acquired in a case where the second image pattern according the comparative example illustrated in FIG. 19 is projected and then imaged.

MODES FOR CARRYING OUT THE INVENTION

Some embodiments of the disclosure are described below in detail with reference to the drawings. It is to be noted that the description is given in the following order.
1. Embodiment of Projection System
   1.1 Configuration
      1.1.1 Functional Configuration Example of Projection System (FIG. 1)
      1.1.2 Specific Configuration Example of Projection System (FIG. 2)
   1.2 Operation (FIG. 3 to FIG. 13)
   1.3 Effects and Comparative Examples (FIG. 14 to FIG. 20)
2. Other Embodiments

1. Embodiment of Projection System

1.1 Configuration (1.1.1 Functional Configuration Example of Projection System)

FIG. 1 illustrates an example of a functional configuration of a projection system according to an embodiment of the disclosure.

The projection system according to the present embodiment includes an image projection section 1 that projects an image, and an image processing unit that performs generation and calibration of a projected image in the image projection section 1. The image processing unit includes a projected-image generator 2 that generates a projected image, a projected-image calibrator 3 that calibrates the projected image, and an imaging section 4 that images a projection screen provided by the image projection section 1. Further, the image processing unit has a projection-transformation-matrix estimation section 5, an image stitching section 6, and a controller 7. The controller 7 controls each functional section.

The imaging section 4 includes a plurality of imaging sections 4A, 4B, and 4C. The imaging section 4 acquires a plurality of partial images, as a captured image, by imaging a projection screen using the plurality of imaging sections 4A, 4B, and 4C through division of the projection screen into a plurality of regions to have partially overlapping imaging regions.

It is to be noted that FIG. 1 illustrates an example in which the one image projection section 1 and the three imaging sections 4 are provided, but the numbers of the respective sections are not limited to those illustrated in the example. For example, in a case where a multi projection system is used, the two or more image projection sections 1 may be provided, and one projection screen may be displayed by joining respective projection screens of the two or more image projection sections 1. In addition, the number of the imaging sections 4 may be increased or decreased depending on a necessary imaging range. Moreover, the imaging section 4 may be only one, which may perform imaging a plurality of times to image a plurality of imaging regions.

The projection-transformation-matrix estimation section 5 performs an operation for estimation of a projection transformation matrix for linking of adjacent partial images adjacent to each other, a plurality of times, on the basis of the captured image obtained by the imaging section 4 (4A, 4B, and 4C).

The projected-image generator 2 generates, for example, an image including a first image pattern 31 (FIG. 4) described later, and an image including a second image pattern 32 (FIG. 7) described later, which are used to estimate the projection transformation matrix, as a projected image. Further, the projected-image generator 2 generates, for example, a projected-image calibration pattern 33 (FIG. 9) described later, as a projected image. The image stitching section 6 stitches (links) a plurality of partial images, which are acquired in a case where the projected-image calibration pattern 33 is projected and then imaged through projection transformation using the estimated projection transformation matrix. The projected-image calibrator 3 calibrates a projected image on the basis of a stitched image.

(1.1.2 Specific Configuration Example of Projection System)

Functions of the projection system illustrated in FIG. 1 are embodied by, for example, a projector 11, an imaging unit 12, and a personal computer 13, as illustrated in FIG. 2.

The projector 11 corresponds to the image projection section 1 of FIG. 1. The projector 11 is installed, for example, in proximity to a screen 8. The projector 11 is, for example, an ultra-short-focus projection type projector that projects a projection image toward the screen 8 from a close range on lower side of the screen 8.

The imaging unit 12 corresponds to the imaging section 4 (4A, 4B, and 4C) of FIG. 1. As the imaging unit 12, for example, a camera module is used, and a projection screen projected onto the screen 8 by the projector 11 is imaged. In the configuration example of FIG. 2, three imaging units 12A, 12B, and 12C are disposed, as the imaging unit 12, on a main body of the projector 11. The imaging units 12A, 12B, and 12C are disposed to allow for imaging of a left imaging region 20A, a central imaging region 20B, and a right imaging region 20C, respectively, of the projection screen on the screen 8. Further, the imaging units 12A, 12B, and 12C are disposed to allow the respective imaging regions to partially overlap.

The personal computer 13 implements the function of each of the projected-image generator 2, the projected-image calibrator 3, the image stitching section 6, the projection-transformation-matrix estimation section 5, and the controller 7 of FIG. 1. The projected-image calibrator 3 is, for example, included in the personal computer 13, as an exclusive projected-image calibration program or apparatus. The number of each of the projectors 11 and the imaging units 12 may be increased or decreased as necessary, as described above. Even in a case where the imaging unit 12 is one, it is possible to acquire a plurality of partial images by imaging each of the plurality of imaging regions by mechanically moving an imaging direction, for example.

1.2 Operation

In the projection system according to the present embodiment, the imaging section 4 acquires a plurality of partial images, as a captured image, by imaging a projection screen provided by the projector 11 that serves as the image projection section 1, through division of the projection screen into a plurality of regions to have partially overlapping imaging regions. The projection-transformation-matrix estimation section 5 performs an operation for estimation of a projection transformation matrix for linking of the adjacent partial images adjacent to each other, a plurality of times, on the basis of the captured image. The projected-image calibrator 3 calibrates the projected image on the basis of an image generated by linking the plurality of partial images through the projection transformation using the projection transformation matrix.

The projection-transformation-matrix estimation section 5 performs first estimation of a projection transformation matrix on the basis of a captured image acquired in a case where an image including the first image pattern 31 is projected. In the first image pattern 31, a plurality of image feature points each having a unique local feature amount are arranged in the entire image. This allows for estimation of a provisional-version projection transformation matrix described later. Further, the projection-transformation-matrix estimation section 5 performs second estimation of the projection transformation matrix on the basis of a captured image acquired in a case where an image including the second image pattern 32 is projected and on the basis of a result of the first estimation of the projection transformation matrix. The second image pattern 32 allows for more highly accurate identification of a coordinate position of an image feature point than the first image pattern 31. This allows for estimation of a high-accuracy-version projection transformation matrix described later.

Description is give below, with reference to FIG. 3, of a specific example of a procedure of calibration of a projected image in the projection system according to the present embodiment.

First, the first image pattern 31 for estimation of the provisional-version projection transformation matrix is projected onto the screen 8 by the image projection section 1 (step S101).

FIG. 4 is an example of the first image pattern 31 to be projected to estimate the provisional-version projection transformation matrix. It is desirable for the first image pattern 31 to be such a pattern that pixels of lightness higher than predetermined lightness and pixels of lightness lower than the predetermined lightness are included around an image feature point. For example, triangles each filled with a random color are laid edge to edge, and colors are selected to allow a high luminance color and a low luminance color to be alternate for adjacent triangles. It is to be noted that, in FIG. 4, colors are monochrome, but various colors such as red and blue may be used for coloring.

FIG. 4 illustrates an example of a pattern in which image feature points are evenly arranged in the entire pattern, and triangles each filled with a random color are laid edge to edge to allow a local feature amount at each of the image feature points to be unique within the pattern. The triangles filled with the high pixel luminance color and the low pixel luminance color around the image feature point are alternately arranged to avoid disappearance of the image feature point even when a captured image partially has blown-out highlights or blocked-up shadows depending on imaging conditions. This arrangement is provided also to avoid an expected local feature amount being less obtainable, due to loss of a luminance gradient, because of colors of adjacent triangles both having blown-out highlights or blocked-up shadows, even though the disappearance of the image feature point does not occur. It is to be noted that shape of each of graphic forms to be laid edge to edge may be configured of another polygon or curve, and may not be uniform.

FIG. 5 is another example of the first image pattern 31 to be projected to estimate the provisional-version projection transformation matrix. Instead of having a layout in which triangles each filled with a random color are laid edge to edge and adjacent triangles have alternate high luminance color and low luminance color, reverse correction may be performed for luminance using luminance unevenness because of imaging conditions other than a projected image. For example, a first image pattern 31A as illustrated in FIG. 5 may be projected. The first image pattern 31A is such a pattern that luminance unevenness occurring in a captured image due to imaging conditions other than a projected image is measured by other means beforehand to avoid occurrence of blown-out highlights or blocked-up shadows in the captured image, and that the luminance is corrected on the basis of a result of such measurement. The first image pattern 31A illustrated in FIG. 5 is an image in which luminance in an upper right part and an upper left part is corrected to be high, assuming imaging conditions under which an upper right part and an upper left part of the screen 8 have low luminance in a case of the configuration example of FIG. 2.

Next, the projection screen in which the first image pattern 31 is projected is imaged using the imaging unit 12 (step S102). FIG. 6 illustrates an example of each of partial images 41A, 41B, and 41C acquired in a case where the first image pattern 31 illustrated in FIG. 4 is projected onto the screen 8, and a projection screen thereof is imaged using the imaging unit 12 (12A, 12B, and 12C) in the configuration example of FIG. 2. FIG. 6 illustrates, from left side, an image captured by the imaging unit 12A disposed on left, an image captured by the imaging unit 12B disposed at center, and an image captured by the imaging unit 12C disposed on right, each facing the screen 8.

Next, the projection-transformation-matrix estimation section 5 extracts an image feature point from each of the partial images 41A, 41B, and 41C, and calculates a local feature amount at the extracted image feature point (step S103). It is possible to utilize an existing technique for an algorithm for the extraction of the image feature point and the calculation of the local feature amount. Examples of the algorithmic include ORB discussed in the following Reference 1.

Reference 1: E. Rublee, V. Rabaud and K Konolige, "ORB: An efficient alternative to SIFT or SURF", Computer Vision and 2011 IEEE International Conference, Barcelona, 2011 Nov. 6-13.

Next, the projection-transformation-matrix estimation section 5 searches for a pair of image feature points having similar local feature amounts from the adjacent partial images 41A, 41B, and 41C (step S104). Examples of a search algorithm include Brute Force that inspects all combinations in a round-robin manner.

Next, the projection-transformation-matrix estimation section 5 estimates a provisional-version projection transformation matrix for stitching of one partial image to the other partial image, using a coordinate pair of a plurality of local feature amounts paired by the above-described search (step S105).

Here, an error may occur in the local feature amount due to an influence of noise or ambient light in the captured image, a projection angle or imaging angle of the projector 11 with respect to the screen 8, a reflection property of the screen 8, and so forth. An influence of the error may generate an unintended pair of image feature points, and may thereby cause an error in the estimated projection transformation matrix. Hence, a high-accuracy-version projection transformation matrix is estimated. The high-accuracy-version projection transformation matrix is obtained by using the above-described projection transformation matrix as a provisional-version projection transformation matrix, and by making the provisional-version projection transformation matrix become highly accurate through projection of the second image pattern 32 onto the screen 8 and through imaging and analysis of the projected second image pattern 32. In order to estimate the high-accuracy-version projection transformation matrix, the projected-image generator 2 generates an image including the second image pattern 32 (step S106).

FIG. 7 illustrates an example of the image including the second image pattern 32 to be projected to estimate the high-accuracy-version projection transformation matrix. It is desirable for the second image pattern 32 to be such a pattern that arrangement spacing between image feature points on a captured image is adjusted to be closer to equal spacing than arrangement spacing between image feature points in a projection screen. In addition, it is desirable for an arrangement spacing between image feature points in the second image pattern 32 to have a value that is greater than a value of a projection transformation error of the provisional-version projection transformation matrix and is smaller than a predetermined value.

FIG. 7 illustrates, as the second image pattern 32, a pattern, in which a plurality of small white circles are arranged in a black background. An image is generated in which each spacing between the plurality of white circles is adjusted to be greater than, but not excessively exceeding, the projection transformation error of the provisional-version projection transformation matrix estimated using the first image pattern 31 on the captured image. In the configuration example of FIG. 2, imaging is performed in an upward direction from a lower part of the screen 8, thus allowing the spacing between the white circles in a lower part to be smaller than that in an upper part in the second image pattern 32 of FIG. 7. An arrangement density of graphic forms in the second image pattern 32 is determined by, for example, acquiring a positional relationship of each of the projector 11, the screen 8, and the imaging unit 12 (12A, 12B, and 12C) by using other means. Alternatively, it is also possible to determine the arrangement density by acquiring a density of image feature points from the captured image of the first image pattern 31.

Next, the generated second image pattern 32 is projected by the image projection section 1 (step S107), and a projection screen of the second image pattern 32 is imaged using the imaging unit 12 (12A, 12B, and 12C) (step S108). FIG. 8 illustrates an example of each of partial images 42A, 42B, and 42C acquired in a case where the second image pattern 32 illustrated in FIG. 7 is projected onto the screen 8 and a projection screen thereof is imaged using the imaging unit 12 (12A, 12B, and 12C) in the configuration example of FIG. 2. FIG. 8 illustrates, from left side, an image captured by the imaging unit 12A disposed on left, an image captured by the imaging unit 12B disposed at center, and an image captured by the imaging unit 12C disposed on right, each facing the screen 8 from left.

Next, the projection-transformation-matrix estimation section 5 extracts coordinates of each of graphic forms in each of the partial images 42A, 42B, and 42C (step S109). The extraction of the coordinates is performed by, for example, converting each of the partial images 42A, 42B, and 42C into a binary image, extracting pixels of an outline forming each of the graphic forms, and calculating barycentric coordinates thereof.

Next, the projection-transformation-matrix estimation section 5 searches for a pair of corresponding coordinates between adjacent partial images again, on the basis of the provisional-version projection transformation matrix estimated using the first image pattern 31 as well as on the basis of the coordinates of each of the graphic forms extracted from the captured image of the second image pattern 32 (step S110). For example, the coordinates of each of the graphic forms extracted from one of the partial images are subjected to projection transformation using the provisional-version projection transformation matrix, and coordinates of a graphic form nearest from the coordinates subjected to the projection transformation are associated therewith in the other partial image. For example, by using a provisional-version projection transformation matrix H' provisionally estimated with use of the first image pattern 31, coordinates A (xA, yA, 1) of one partial image A is subjected to projection transformation to match the one partial image A with the other partial image B. At this time, an error such as obtaining B (xB, yB, 1)+ΔB (ΔxB, ΔyB, 1) may occur, instead of obtaining coordinates B (xB, yB, 1) of a corresponding white circle in the other partial image B. However, in the present embodiment, the second image pattern 32 is generated to allow a spacing between white circles to be greater than ΔB, thus making it possible to select coordinates of a nearest white circle, which allows for recognition of the coordinates B (xB, yB, 1) as correct corresponding coordinates.

Next, the projection-transformation-matrix estimation section 5 estimates a high-accuracy-version projection transformation matrix for stitching of one of the partial images to the other, using the plurality of coordinate pairs between the partial images resulting from paring through the above-described search (step S111). In the present embodiment, it is possible to obtain a more highly accurate projection transformation matrix by performing estimation from more accurate coordinate pairs, as compared with the provisional-version projection transformation matrix.

Next, the projected-image calibration pattern 33 to be utilized by the projected-image calibrator 3 for calibration is projected onto the screen 8 by the image projection section 1 (step S112). Subsequently, a projection screen formed by projecting the projected-image calibration pattern 33 is imaged by the imaging unit 12 (12A, 12B, and 12C) (step S113). FIG. 9 illustrates an example of the projected-image calibration pattern 33 to be used for the calibration of the projected image. FIG. 10 illustrates an example of each of partial images 43A, 43B, and 43C acquired in a case where the projected-image calibration pattern 33 illustrated in FIG. 9 is projected onto the screen 8 and a projection screen thereof is imaged using the imaging unit 12 (12A, 12B, and 12C) in the configuration example of FIG. 2. FIG. 10 illustrates, from left side, an image captured by the imaging unit 12A disposed on left, an image captured by the imaging unit 12B disposed at center, and an image captured by the imaging unit 12C disposed on right, each facing the screen 8.

Next, the image stitching section 6 subjects the imaged projected-image calibration pattern 33 to projection transformation using the high-accuracy-version projection transformation matrix (step S114). FIG. 11 illustrates an example of each of partial images 44A, 44B, and 44C obtained by subjecting the partial images 43A, 43B, and 43C of the projected-image calibration pattern 33 illustrated in FIG. 10 to the projection transformation. FIG. 11 illustrates, from upper side, an image subjected to the projection transformation of the image captured by the imaging unit 12A disposed on left, an image subjected to the projection transformation of the image captured by the imaging unit 12B disposed at center, and an image subjected to the projection transformation of the image captured by the imaging unit 12C disposed on right, each facing the screen 8. More specifically, in the configuration example of FIG. 2, the partial images 43A and 43C captured by the imaging units 12A and 12C disposed on left and right are subjected to the projection transformation, using the high-accuracy-version projection transformation matrix estimated to match the partial images 43A and 43C captured by the imaging units 12A and 12C disposed on left and right with the partial image 43B at center among the partial images 43A, 43B, and 43C illustrated in FIG. 10.

Next, the image stitching section 6 stitches the partial images 44A, 44B, and 44C subjected to the projection transformation (step S115). A translational component is included in the estimated projection transformation matrix, thus making it unnecessary to perform alignment between images. Examples of a stitching method include alpha blending. FIG. 12 illustrates an example of a stitched image 34 subjected to stitching of the partial images 44A, 44B, and 44C illustrated in FIG. 11.

Finally, the stitched image 34 is inputted into the projected-image calibrator 3, and the projected-image calibrator 3 performs the calibration of the projected image (step S116).

Modification Example

In the procedure illustrated in FIG. 3, the procedure of the projection and the imaging of the image including the first image pattern 31 and the procedure of the projection and the imaging of the image including the second image pattern 32 are performed separately, but these procedures may be collectively performed. For example, it is possible to perform the above-described procedures collectively, by projecting a mixture pattern 35 in which the first image pattern 31 and the second image pattern 32 are mixed, as illustrated in FIG. 13.

Further, it is also possible to obtain an image that imitates an imaging position other than the front of the screen 8, by subjecting projection transformation such as keystone correction to an image after stitching. Furthermore, in the configuration example of FIG. 2, the projector 11 is of the ultra-short-focus projection type, and the imaging position is in proximity to the screen 8; however, the technique based on the present embodiment is also applicable to other type of projector 11 and other imaging position.

1.3 Effects and Comparative Examples

As described above, according to the present embodiment, the operation for estimation of the projection transformation matrix for linking of the adjacent partial images is performed a plurality of times, thus making it possible to estimate the projection transformation matrix accurately. The calibration of the projected image is performed on the basis of the stitched image generated by linking the plurality of partial images through the projection transformation using the estimated projection transformation matrix. This makes it possible to perform the calibration of the projected image accurately.

In a case of stitching a plurality of captured images obtained by imaging each of regions of a projection screen provided by the projector 11 in a partially overlapping manner, it is possible to estimate a projection transformation matrix for accurate stitching using the technique of the present embodiment, even when luminance unevenness occurs. The luminance unevenness occurs due to an influence of noise or ambient light, a projection angle or imaging angle of the projector 11 with respect to the screen 8, a reflection property of the screen 8, and so forth. It is possible to reduce distortion in the stitched image, and to perform accurate calibration of a projected image by utilizing the stitched image.

The technique of the present embodiment includes Techniques 1 and 2 as follows, and effects thereof are described.
(Technique 1)

As illustrated in FIG. 4, a pattern, in which pixels of lightness higher than predetermined lightness and pixels of lightness lower than the predetermined lightness are included around an image feature point, is used as the first image pattern 31 to be projected to estimate the provisional-version projection transformation matrix.
(Technique 2)

As illustrated in FIG. 7, a pattern, in which, arrangement spacing between image feature points on a captured image is adjusted to be closer to equal spacing than arrangement spacing between image feature points in a projection screen, is used as the second image pattern 32 to be projected to estimate the high-accuracy-version projection transformation matrix.

Description is given below using, by way of example, a case where the reflection property of the screen 8 has a reflection-type property in which incident light is reflected more strongly toward opposite side across a normal of a screen surface. Further, description is given below using, by way of example, a case where a projection screen is imaged by the imaging unit 12 (12A, 12B, and 12C) in the configuration example of FIG. 2.

FIG. 14 illustrates an example of each of partial images 51A, 51B, and 51C acquired as a captured image, in a case where the first image pattern 31 illustrated in FIG. 4 is projected onto the screen 8 having the above-described reflection-type property, and then imaged. FIG. 15 illustrates an example of each of partial images 52A, 52B, and 52C acquired as a captured image, in a case where imaging conditions are adjusted for FIG. 14. FIG. 14 and FIG. 15 each illustrate, from left side, an image captured by the imaging unit 12A disposed on left, an image captured by the imaging unit 12B disposed at center, and an image captured by the imaging unit 12C disposed on right, each facing the screen 8.

In FIG. 14, a right upper end and a left upper end of the screen 8 are imaged to be dark. In contrast, in FIG. 15, imaging is performed by adjusting imaging conditions such as imaging exposure time and a gain of the imaging unit 12 (12A, 12B, and 12C) to avoid low imaging luminance at the right upper end and the left upper end of the screen 8, and a central lower part of the screen 8 is imaged to be bright. In both of FIG. 14 and FIG. 15, an image feature point, which is a vertex of a triangle, is imaged without disappearing.

In contrast, FIG. 16 illustrates an example of a first image pattern 36 of a comparative example, in which each triangle is filled with random image luminance without using Technique 1 described above, unlike the first image pattern 31 illustrated in FIG. 4. FIG. 17 illustrates an example of each of partial images 36A, 36B, and 36C acquired as a captured image, in a case where the first image pattern 36 according to the comparative example illustrated in FIG. 16 is projected onto the screen 8 having the above-described reflection-type property, and then imaged. FIG. 18 illustrates an example of each of partial images 37A, 37B, and 37C acquired as a captured image, in a case where imaging is performed for FIG. 17 by adjusting imaging conditions in a manner similar to that described above. FIG. 17 and FIG. 18 each illustrate, from left side, an image captured by the imaging unit 12A disposed on left, an image captured by the imaging unit 12B disposed at center, and an image captured by the imaging unit 12C disposed on right, each facing the screen 8.

It can be appreciated, from FIG. 17 and FIG. 18, that the image feature points disappear due to blown-out highlights or blocked-up shadows in luminance around image feature points of a portion of a captured image. In addition, there is a possibility that loss of a luminance gradient may occur due to blown-out highlights or blocked-up shadows of both of colors of adjacent triangles even when image feature points do not disappear, thus causing an expected local feature amount to be less obtainable.

In other words, generating the first image pattern 31 using Technique 1 described above suppresses easy occurrence of a decrease in corresponding coordinate pairs between images due to disappearance of an image feature point, even when luminance unevenness occurs on a captured image. Further, such a generation also suppresses easy occurrence of an error in paring of image feature points due to calculation of an unexpected local feature amount, thus making it possible to improve accuracy of estimation of a provisional-version projection transformation matrix. The improvement in the accuracy of the estimation of the provisional-version projection transformation matrix makes it possible to increase an arrangement density of graphic forms on the second image pattern 32, thus making it possible to increase corresponding coordinate pairs between images. It is therefore possible to expect improvement in accuracy of estimation of the high-accuracy-version projection transformation matrix.

In the above-described example, the reflection property of the screen 8 is of the reflection type. However, Technique 1 described above is effective for other reflection properties that may cause luminance unevenness of a captured image, or when luminance unevenness occurs due to an influence of ambient light, etc.

Next, FIG. 19 illustrates an example of a second image pattern 38 of a comparative example, that is created without using Technique 2 described above, to allow each spacing between graphic forms to be uniform without being adjusted, unlike the second image pattern 32 illustrated in FIG. 7. FIG. 20 illustrates an example of each of partial images 38A, 38B, and 38C acquired as a captured image, in a case where the second image pattern 38 according to the comparative example illustrated in FIG. 19 is projected and then imaged. FIG. 20 illustrates, from left side, an image captured by the imaging unit 12A disposed on left, an image captured by the imaging unit 12B disposed at center, and an image captured by the imaging unit 12C disposed on right, each facing the screen 8.

In the second image pattern 38 of the comparative example, each spacing between graphic forms is not adjusted. Hence, in a region where a spacing between coordinates of the respective graphic forms is small on a captured image, as in an upper part of the image in FIG. 20, there is a possibility that the spacing between the coordinates of the respective graphic forms is smaller than a projection transformation error of the provisional-version projection transformation matrix. This may cause wrong pairing of corresponding coordinates between images, and thereby lead to deterioration in accuracy of estimation of the projection transformation matrix. For example, in order to match one partial image A with the other partial image B, the coordinates A (xA, yA, 1) of the one partial image A is subjected to projection transformation using the provisional-version projection transformation matrix H' provisionally estimated with use of the first image pattern 31. At this time, the error such as obtaining B (xB, yB, 1)+ΔB (ΔxB, ΔyB, 1) may occur, instead of obtaining the coordinates B (xB, yB, 1) of a corresponding white circle in the other partial image B. In the second image pattern 38 of the comparative example, an arrangement is provided to allow a spacing ΔB' (ΔxB', ΔyB', 1) between graphic forms to satisfy |AB'|<|ΔB|. Hence, when coordinates of a nearest white circle is assumed to be corresponding coordinates, there is a possibility that wrong pairing may be made, instead of paring with the coordinates B.

In addition, in the case where the second image pattern 38 of the comparative example is used, the spacing between the coordinates of the respective graphic forms is excessively larger than the projection transformation error of the provisional-version projection transformation matrix in a region where a spacing between coordinates of the respective graphic forms is large on the captured image, as in a lower part of the image in FIG. 20. Hence, there is a possibility that corresponding coordinate pairs between images may decrease, as compared with the second image pattern 32 of FIG. 7 in which the spacing is adjusted. Moreover, the accuracy of estimation of the projection transformation matrix may be lowered.

For the above-described reasons, it is possible to expect an improvement in accuracy of estimation of the high-accuracy-version projection transformation matrix, by using Technique 2 described above.

It is to be noted that the effects described herein are mere examples without being limitative, and other effects may also be provided.

2. Other Embodiments

The technique based on the disclosure is not limited to the description of the above-described embodiments, and may be modified in a variety of ways.

For example, the technology may adopt the following configurations.

(1)

An image processing unit including:

an imaging section that acquires a plurality of partial images as a captured image, by imaging a projection screen provided by a projector through division of the projection screen into a plurality of regions to have partially overlapping imaging regions; and an estimation section that performs an operation a plurality of times on a basis of the captured image, the operation being performed to estimate a projection transformation matrix for linking of the partial images adjacent to each other.

(2)

The image processing unit according to (1), further including a calibrator that performs calibration of a projected image projected by the projector, on a basis of an image generated by linking the plurality of partial images through projection transformation using the projection transformation matrix.

(3)

The image processing unit according to (1) or (2), in which the estimation section performs first estimation of the projection transformation matrix, on a basis of the captured image acquired in a case where an image including a first image pattern is projected, the first image pattern having a plurality of image feature points that each have a unique local feature amount and are arranged throughout the image.

(4)

The image processing unit according to (3), in which the estimation section performs second estimation of the projection transformation matrix, on a basis of the captured image acquired in a case where an image including a second image pattern is projected and a result of the first estimation of the projection transformation matrix, the second image pattern allowing for more highly accurate identification of a coordinate position of each of the image feature points than the first image pattern.

(5)

The image processing unit according to (3) or (4), in which the first image pattern includes, around each of the image feature points, a pixel of lightness higher than predetermined lightness and a pixel of lightness lower than the predetermined lightness.

(6)

The image processing unit according to (4) or (5), in which the second image pattern is a pattern in which arrangement spacing between the image feature points on the captured image is adjusted to be closer to equal spacing than arrangement spacing between the image feature points in the projection screen.

(7)

The image processing unit according to (6), in which the arrangement spacing between the image feature points in the second image pattern has a value that is greater than a value of a projection transformation error of the projection transformation matrix in the first estimation and is smaller than a predetermined value.

(8)

The image processing unit according to any one of (4) to (7), in which the projection and the imaging of the image including the first image pattern and the projection and the imaging of the image including the second image pattern are performed separately.

(9)

The image processing unit according to any one of (4) to (7), in which the estimation section performs the first estimation and the second estimation of the projection transformation matrix, on a basis of the captured image acquired in a case where an image in which the first image pattern and the second image pattern are mixed is projected.

(10)

An image processing method including:

acquiring a plurality of partial images as a captured image, by imaging a projection screen provided by a projector through division of the projection screen into a plurality of regions to have partially overlapping imaging regions; and performing an operation a plurality of times on a basis of the captured image, the operation being performed to estimate a projection transformation matrix for linking of the partial images adjacent to each other.

(11)

A projection system including:

a projector;

an imaging section that acquires a plurality of partial images as a captured image, by imaging a projection screen provided by a projector through division of the projection screen into a plurality of regions to have partially overlapping imaging regions; and an estimation section that performs an operation a plurality of times on a basis of the captured image, the operation being performed to estimate a projection transformation matrix for linking of the partial images adjacent to each other.

This application is based upon and claims priority from Japanese Patent Application No. 2015-123612 filed with the Japan Patent Office on Jun. 19, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image processing unit, comprising:
circuitry configured to:
image a projection screen, wherein the projection screen is provided by a projector;
acquire a plurality of partial images as a captured image based on a division of the projection screen into a plurality of regions, wherein the plurality of regions has partially overlapped imaging regions; and
perform first estimation of a projection transformation matrix based on the captured image, wherein
the first estimation of a projection transformation matrix is performed in a case where a first image pattern composed of the plurality of partial images is projected by the projector as the projection screen, and
each partial image of the plurality of partial images has an image feature point with a unique local feature amount.

2. The image processing unit according to claim 1, wherein the circuitry is further configured to:
link the plurality of partial images based on the projection transformation matrix to generate a stitch image; and
calibrate the projection screen projected by the projector based on the stitch image.

3. The image processing unit according to claim 1, wherein the circuitry is further configured to perform second estimation of the projection transformation matrix based on the captured image and a result of the first estimation, wherein the second estimation is performed in a case where a second image pattern is projected by the projector as the projection screen.

4. The image processing unit according to claim 1, wherein the first image pattern includes, around the image feature point of each of the plurality of partial images, a first pixel of lightness higher than a specific lightness and a second pixel of lightness lower than the specific lightness.

5. The image processing unit according to claim 3, wherein in a case where the second image pattern is projected, arrangement spacing between image feature points on the captured image is substantially equal.

6. The image processing unit according to claim 5, wherein a value of arrangement spacing between image feature points in the second image pattern is greater than a value of a projection transformation error of the projection transformation matrix in the first estimation and is smaller than a specific value.

7. The image processing unit according to claim 3, wherein the projection and imaging of the first image pattern is independent to the projection and imaging of the second image pattern.

8. The image processing unit according to claim 3, wherein the circuitry is further configured to perform the first estimation of the projection transformation matrix and the second estimation of the projection transformation matrix based on the captured image in a case where the projection screen projected by the projector is composed of a combination of the first image pattern and the second image pattern.

9. An image processing method, comprising:
  imaging a projection screen, wherein the projection screen is provided by a projector;
  acquiring a plurality of partial images as a captured image based on a division of the projection screen into a plurality of regions, wherein the plurality of regions has partially overlapping imaging regions; and
  performing first estimation of a projection transformation matrix based on the captured image, wherein
  the first estimation of the projection transformation matrix is performed in a case where a first image pattern composed of the plurality of partial images is projected by the projector as the projection screen, and
  each partial image of the plurality of partial images has an image feature point with a unique local feature amount.

10. A projection system, comprising:
  a projector configured to project a projection screen; and
  circuitry configured to:
    image the projection screen;
    acquire a plurality of partial images as a captured image based on a division of the projection screen into a plurality of regions, wherein the plurality of regions has partially overlapped imaging regions; and
    perform first estimation of a projection transformation matrix based on the captured image, wherein
    the first estimation of the projection transformation matrix is performed in a case where a first image pattern composed of the plurality of partial images is projected by the projector as the projection screen, and
    each partial image of the plurality of partial images has an image feature point with a unique local feature amount.

* * * * *